United States Patent [19]

Jones

[11] 3,983,538

[45] Sept. 28, 1976

[54] UNIVERSAL LSI ARRAY LOGIC MODULES WITH INTEGRAL STORAGE ARRAY AND VARIABLE AUTONOMOUS SEQUENCING

[75] Inventor: John W. Jones, Poughkeepsie, N.Y.

[73] Assignee: International Business Machines Corporation, Armonk, N.Y.

[22] Filed: May 1, 1974

[21] Appl. No.: 465,783

[52] U.S. Cl. ............................. 340/172.5; 235/152
[51] Int. Cl.² ......................................... G06F 7/00
[58] Field of Search ..................... 340/172.5; 445/1; 235/152, 156

[56] References Cited
UNITED STATES PATENTS

| | | | |
|---|---|---|---|
| 3,287,702 | 11/1966 | Borck, Jr. et al. | 340/172.5 |
| 3,287,703 | 11/1966 | Slotnick | 340/172.5 |
| 3,296,426 | 1/1967 | Ball | 235/152 |
| 3,313,926 | 4/1967 | Minnick | 235/152 |
| 3,462,742 | 8/1969 | Miller et al. | 340/172.5 |
| 3,473,160 | 10/1969 | Wahlstrom | 340/172.5 |
| 3,535,498 | 10/1970 | Smith, Jr. | 235/152 |
| 3,737,866 | 6/1973 | Gruner | 340/172.5 |
| 3,757,306 | 9/1973 | Boone | 340/172.5 |
| 3,798,606 | 3/1974 | Henle et al. | 340/172.5 |

*Primary Examiner*—Charles E. Atkinson
*Attorney, Agent, or Firm*—Robert Lieber

[57] ABSTRACT

A universal array logic module featuring autonomous operation includes interconnected array structured logic and a small writable storage array. The module is subject to large scale integrated packaging as a standardly dimensioned unit (e.g. chip). The internal connections form discrete first and second internal circulation loops in one of which the storage array connects as a serial constituent randomly addressable by signals carried in the other loop. The storage array typically holds eight 32-bit words. The logic arrays may be read-only structures organized to perform arithmetic and translational logic manipulations under autonomous (internal) control. The module assembly includes integral input/output gating for transferring signals between an external bus and the internal loops. The logic array structure permits both external and internal control of cyclic operation. The operation repertoire includes interrupts, resets, and sequence branches. Interrupted status (loop signals) is saved in predetermined address locations of the storage array, requiring novel manipulation and storage of the address argument of the interrupted cycle. The logic arrays may be economically configured as read-only structures.

68 Claims, 14 Drawing Figures

FIG. 4  OUTER LOOP PARAMETERS

| FIELD | NAME | FUNCTION |
|---|---|---|
| f | OP CODE | PROCESS OPERATION CONTROL |
| s | SEQ. COUNT | OPERATION SEQ.(CYCLE) CONTROL |
| S | STATE BITS | PROCESS SEQ. BRANCHING & INTERRUPT CONTROL |
| N | NEST COUNT | STACK ADDRESS FOR INTERRUPT STATUS SAVING |
| A | ADDRESS | SELECT STACK LOCATION |
| D | DATA | CONNECT TO EXT. OUT & DATA MANIPULATION COLS. OF AND ARRAY |

FIG. 3

OPERATION REPERTOIRE (TYPICAL MODULE)

| EXT. BUS IN CONTROL PARAMETER | OUTER LOOP CONTROL PARAMETER | FUNCTION |
|---|---|---|
| | $f_1, S_X, A_Y$ | SHIFT OUTER LOOP FIELD DESIGNATED BY X INTO Y LOCATION OF STACK; MANIPULATE $f, S, A, \ldots$ PER $f, X$ |
| | $f_2, S_X, A_Y$ | SHIFT CONTENT OF STACK Y TO OUTER LOOP COLUMNS DESIGNATED BY X; MANIPULATE $f, S, A, \ldots$ PER $f, X$ |
| | $f_3, S_X, A_Y$ | ADD BYTES AT STACK Y AND OUTER LOOP; STORE SUM IN STACK Y; MANIPULATE $f, S, A, \ldots$ PER $f, X$ |
| | $f_4 S_X, ---$ | GATE OUTER LOOP POSITIONS ($S_X$) TO EXT. BUS; MANIPULATE $f, S, A, \ldots$ PER X |
| | $f_5, -, A_Y$ | GATE STACK Y OUT TO EXT. BUS; MANIPULATE $f, S, \ldots$ |
| | $f_6, -, A_Y$ | GATE EXT. BUS IN TO STACK Y; MANIPULATE $f, S, \ldots$ |
| | $f_7, S_X, A_Y$ | TEST OUTER LOOP BIT DESIGNATED BY $S_X$; BRANCH ON CONDITION OF $S_X \ldots$ |
| | $-, S_{X_0}, -$ | CONDITION INTERNAL INTERRUPT OR RESET PER $X_0$ |
| | $f_8, S_X, -$ | RECYCLE (WAIT) AND TAKE CONDITIONAL BRANCH ON EXTERNAL IN/INTERNAL RESET/ INTERNAL INTERRUPT FIELD(S) DESIGNATED BY $S_X$ |
| $ER_X$ | $-,-,-$ | CONDITION $f, S, A, s$ FIELDS PER X TO EFFECT RESET OF STACK AND BRANCH TO WAIT STATE OR OTHER "INITIALIZED" CONDITION |
| $EI_X$ | $-,-,-$ | INITIATE INTERRUPT SEQUENCE [TO EFFECT SAVING OF OUTER LOOP STATUS IN STACK LOCATION DETERMINED BY N, INCREMENTING OF N, INTERRUPT PROCESSING, RESTORATION OF OUTER LOOP STATES AND DECREMENTING OF N] |
| $EC_X$ | $-,-,-$ | CONDITION OUTER LOOP CONTROL FIELDS PER X TO EFFECT DESIGNATED OPERATION (E.G. TO EFFECT DATA LOADING IN STACK AND ADDITIVE DATA MANIPULATION) |

FIG. 5 INTERNAL RESETS / INTERRUPT PARAMETERS

RP: POWER ON RESET
RS: SYSTEM RESET
II: INTERNAL ERROR INTERRUPT-PROCESS STEP INCLUDES STATUS OUT TO EXT. BUS & WAIT SEQUENCE

FIG. 6 EXTERNAL IN PARAMETERS

ER: EXTERNAL SYSTEM RESET
EI: EXTERNAL INTERRUPT
EC: EXTERNAL LOGIC CONTROL
ED: EXTERNAL DATA

UNIVERSAL LSI ARRAY LOGIC MODULES WITH INTEGRAL STORAGE ARRAY AND VARIABLE AUTONOMOUS SEQUENCING

BACKGROUND OF THE INVENTION

1. Field of the Invention

The invention pertains to large-scale integrated logic array networks and particularly to such networks employing logic array structures having standardized form and dimensions.

2. Description of the Prior Art

Prior art LSI logic networks which employ array structured logic usually contemplate shared external control of individual arrays in each operating cycle. In certain applications, however, small autonomously sequenced array modules are considered more efficient; for instance, in channel or input/output adapter sections of data processing systems or in distributed processing networks. It is also generally known that array structured logic is most useful as a substitute for randomly connected logic, irrespective of considerations of expense and design complexity, in applications involving frequent engineering change or low volume production of structurally similar but logically different parts. The universal logic module structure to be described herein makes it possible to construct a large variety of autonomously sequenced array networks having logically distinct operation repertoires from arrays having extensively standardized form, dimensions and fabrication process handling.

SUMMARY OF THE INVENTION

The subject universal logic module comprises standardly dimensioned and interconnected logic and storage arrays subject to unitized large scale integration packaging. Module fabrication is extensively standardized, except for cross-point personalization of the logic arrays when these arrays have read-only form. With more expensive writable logic arrays the cross-point connections may be standardized and offset to some extent the additional logic hardware and software expense.

The internal conduction and connection elements in each module form several discrete cyclic signal manipulation paths, or loops, characterized by a capability to cyclically shift signals between loops. The storage array comprises plural registers having common read/write and address selection coupling to these loops. The logic and storage arrays are cooperative to perform combinational and sequential logical sum and product translation operations on signals circulating in the loops. Each module comprises integral gating circuits for input/output coupling to an external bus which may be shared by multiple modules for distributed or parallel processing usage.

The logic arrays, which as indicated above are configured as read-only structures for the sake of economy, are adapted to provide a variety of cyclic sequences of operations subject either to external or internal (autonomous) control of operation sequencing in individual cycles. The potential sequence control repertoire of a module includes interrupts, resets, multisequence conditional branches, and data manipulations (addition, multiplication, etc.). Interruptions are effected by saving (and later reassembling) status signal states, which represent "next cycle" input stimuli to the logic array and the address controls of the storage array, in a predetermined address location of the storage array. This requires special manipulation of the "saved" address status and address signal designating the saving locations; especially when the operation being interrupted is itself an interruption of another operation.

The foregoing and other features of the invention, as well as objectives thereof, will be appreciated from the following detailed description.

DESCRIPTION OF THE DRAWINGS

FIG. 3 illustrates a typical operation repertoire of a subject module;

FIGS. 4-6 illustrate typical information signal parameters utilized in the subject module;

DETAILED DESCRIPTION

1. General Organization

Figure 1:
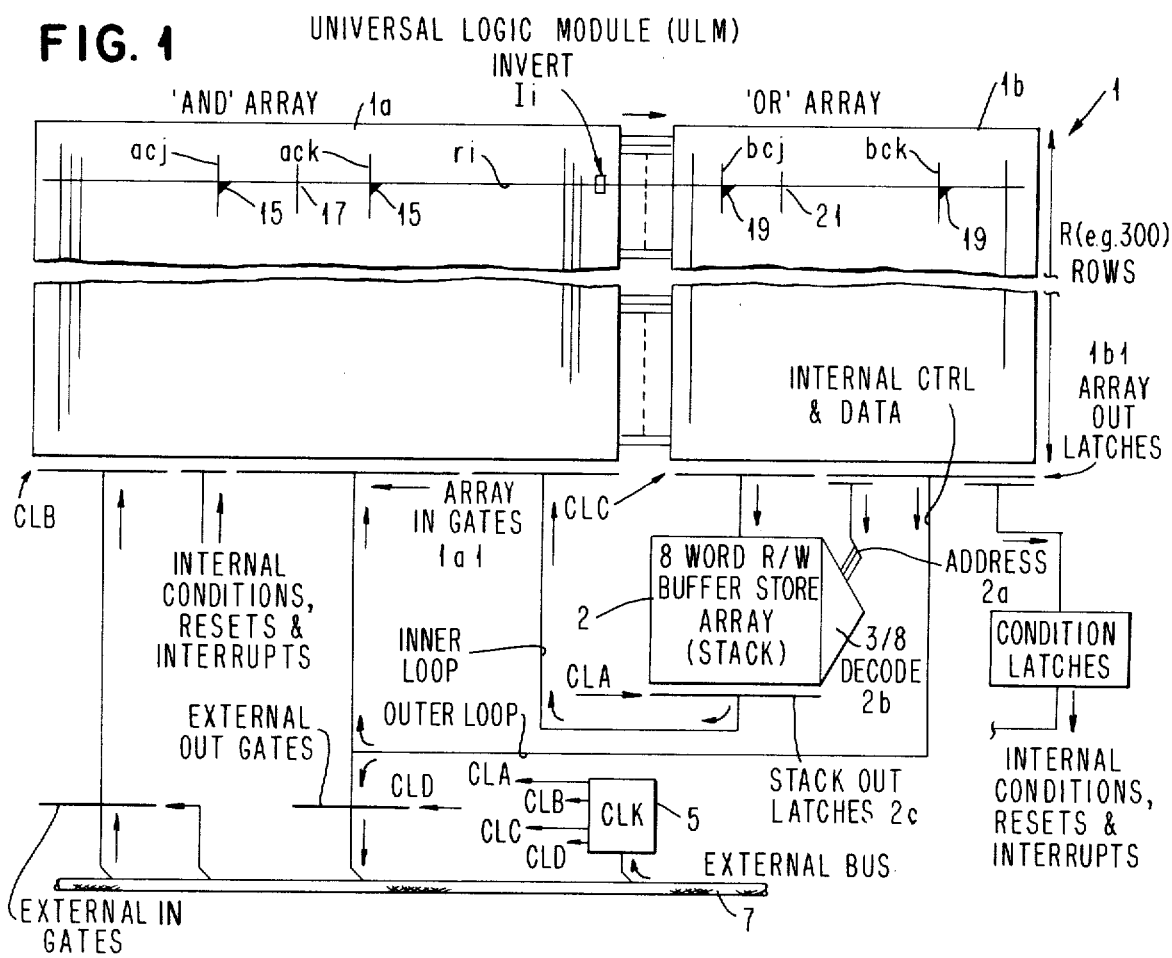
FIG. 1 schematically illustrates the universal logic module of the present invention.

Referring to FIGS. 1-6, a subject universal logic module, ULM comprises logic array section 1 and storage array section 2 (also designated STACK). The logic array may comprise discrete AND array and OR array sections 1a and 1b as indicated in FIG. 1. The dimensions of the storage array are small by comparison to those of the logic array. A typical logic array as presently contemplated would have several hundred rows and 100 or more columns (i.e. in excess of 20,000 "stored" cross-point coupling bit states). A typical storage array as presently contemplated would have capacity to store eight 32 bit words subject to random access (i.e. bit storage capacity of 256 bits).

Storage array address selection is controlled via a decoding network 2b which translates three digit address codes at address selection inputs 2a into selection control on a unique one of eight word storage positions. Address inputs to 2a are supplied via latched outputs 1b1 of logic array section 1b. Module cycle timing is governed by clock signals CLA, CLB, CLC, CLD supplied by a clock network CLK indicated conceptually at 5. In actuality the clock signals may be developed either internally by integral module circuits or externally by common circuits coupled to several modules via the external bus 7.

Signal conduction connections between STACK output latches 2c and respectively positioned logic array input gates 1a1 represent a first signal circulation path designated INNER LOOP. Similarly conduction connections between the indicated subsets of array output latches 1b1 and array input latches 1a1 define a second circulation path designated OUTER LOOP. Each line, between logic 1 and STACK 2 and between 1b1 and gates 1a1 actually represents multiple parallel signal conduction paths.

Figure 2:
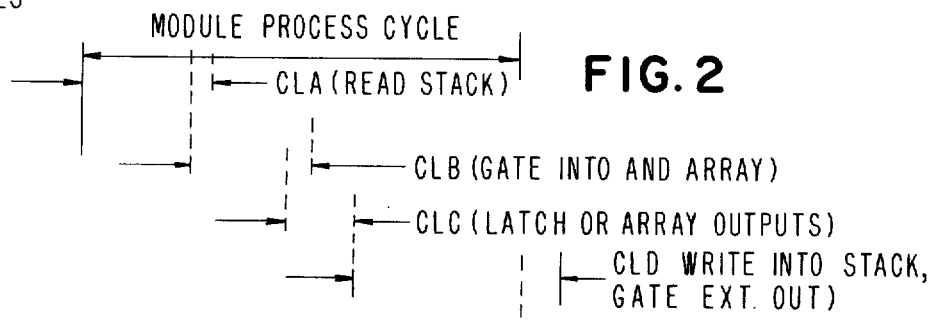
FIG. 2 graphically illustrates the cycle timing of said module.
Figure 7:
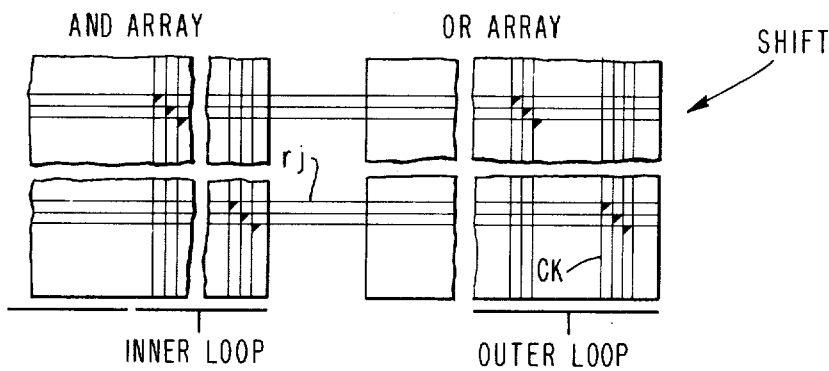
FIGS. 7-10 schematically illustrate unidirectional cross-point connection configurations in the logic array of a subject module for effecting column shifting, logic manipulation, logical exclusive OR-ing and counting operations.
Figure 8:
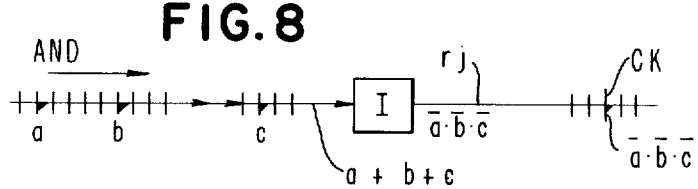

Referring to FIGS. 1 and 2 in the cycle phase associated with "on" state of CLA contents of a selected STACK address are read out and latched in output latches 2c. In the cycle stage associated with activation of CLB latches 2c and previous cycle outputs of logic array section 1b, the latter held in latches 1b1, are connected to respective input columns of array section 1a to provide input (argument) stimuli for logical manipulation. Simultaneously external stimuli signals may be applied to other respective columns of array 1, via the external bus 7 and externally selected EXTERNAL IN gates, the latter integrally contained in the module. In this same stage internal reset and interrupt selection control is applied. In cycle phase CLC outputs of array section 1b are latched in array output latches 1b1. Finally, in cycle stage CLD signals held in respective array output latches 1b1 may be selectively transferred to the external bus 7, via integrally contained EXTERNAL OUT gates, and contents of other respective latches 1b1 may be stored in the STACK at the address designated by respective signals at addressing interface 2a.

In each cycle phase CLB in which the actual logical manipulation occurs, input stimuli signals applied to array section 1a (from the internal loop, the reset control paths and/or the external bus input gating path) may have "logical data" and/or "logical control" significance. Logical control input stimuli are used both to determine the specific manipulation of the logical data stimuli in the current cycle and to establish logical control stimuli of the next cycle. The manner in which this sequence control is effected will be explained below. For the present it should be understood at least that the following operation sequence may occur in any cycle: (1) a STACK word may be read out and latched; (2) the latched STACK output and a part of the previous cycle output of array 1 may be applied in parallel to respective column inputs of array 1, respectively via the INNER LOOP and OUTER LOOP, and logically manipulated (translated) by array 1; when appropriate, external signals may be supplied concurrently to array 1 via respective EXTERNAL IN conduction and gating paths; when appropriate reset and interrupt control initiating signals may be supplied via other respective paths; (3) outputs of array 1 may be latched at 1b1; (4) latched outputs at 1b1 coupling to the INNER LOOP may be selectively written into the STACK and outputs coupling to the OUTER LOOP may be connected via the EXTERNAL OUT gating path to the bus 7. It should also be understood that in each cycle plural logical translations may be performed by the array 1, including translations to determine the control stimuli for the next cycle, and that the control and data stimuli may be selectively supplied to array 1 via any of the available input conduction paths (EXTERNAL IN, INNER LOOP, OUTER LOOP, INTERNAL RESET/INTERRUPT).

2. Operation Repertoire/Capability

Before considering details of module construction it would be useful to understand the operational capabilities of the module organization just described. FIGS. 3–6 indicate that such modules are capable of being configured (by personalization of array sections 1a, 1b) to load external information in selected STACK locations, receive initial external control and thereafter operate autonomously over several cycles to perform various data processing operations (e.g. addition, shifting, conditional branching, interruption, etc.) relative to information stored in the STACK.

Referring to FIG. 3 external and internal control argument parameters listed in FIGS. 4–6 are useful to condition the logic array cyclically to perform storage and logic operations (translation, shifting, formation of select logical sums of select logical products, etc.), relative to parallel signal stimuli on the INNER LOOP and OUTER LOOP, and to condition the module to perform condition manifesting, sequence initiation and/or external input/output gating operations. Combinations of such cyclic operations may be linked selectively into autonomous sequences of varied form by the various branching, interrupting, and resetting translation control patterns of the logic array. Such sequences may be organized for accomplishing interruptible selective data processing functions (e.g. addition, multiplication, division, status storage incidental to interruption, restoration of interrupted control states from stored status, and resetting or initializing of module/STACK states). This in effect permits each module to be configured to operate autonomously as a selectively programmed mini-processor with distinctively specialized or personalized operation capabilities and repertoire.

3. Array Construction/Specific Operations

FIGS. 1 and 7–9 illustrate logic array constructions for implementating the foregoing operations relative to binary signals supplied at 1a1. FIG. 1 illustrates typical cross-point coupling constructions at row $i$ and various selected columns of logic array 1. Triangular shading as at 15 in array section 1a represent unidirectional logical OR coupling connections from respective intersecting column conduction paths ($ac_j$, $ac_k$, . . . ) to the respective row conduction path $r_i$. Intersections such as 17 which do not have triangular shading are understood to have respective column conductors effectively or logically decoupled from row conductor $r_i$. Thus the signal on path $r_i$ in section 1a represents the logical OR of only the coupled input argument signal functions transferred through the couplings 15 to that path.

The column conductors of array 1a receive the true and complement component signals of each input argument to be processed by the array. Alternatively, input arguments may be transferred through discrete decoding logic to form the requisite column inputs.

Each row conduction path $r_i$ in logic array section 1a couples to a corresponding extended row conduction path of array section 1b via a respective inverting element $I_i$. The signal output of each inverter $I_i$ thereby represents the logical NOR of signals on the column input conduction paths of array 1a received via connections 15 and $r_i$. Equivalently, the output of $I_i$ represents the logical AND of the logical inverses of the inputs received via couplings 15. Naturally by providing appropriate true and complement inputs to section 1a the output of any row inverter $I_i$ can be made to represent the logical AND of any select group of input arguments. Thus, it is seen that each row conduction path of section 1a can be configured to provide a unique logical AND signal translation (minterm) of an associated select sub-group of input argument of stimuli signals relative to the group of all input stimuli signals presented to gates 1a1 of section 1a.

Each row conduction path in array section 1b couples to one or more selected column conduction paths of section 1b via "OR coupling" connections indicated symbolically by trangular shading as at 19; distinguished from non-connections symbolically indicated by absence of shading as at 21. Any column conduction path in 1b may be coupled to a plurality of rows and thereby provide an output which represents a logical-OR of signals received from respectively coupled row conduction paths in 1b; i.e. a select logical sum of select logical products of input stimuli or argument signals received by array section 1a.

3a. Shifting

In a simple translating or shifting operation (FIG. 7) signal representations of inverses of data functions to be shifted (shift data arguments) and of not shown inverses of associatively paired shift control operators (shift control arguments) are received on appropriate columns of array section 1a. Associated (paired) shift data and shift control arguments are NOR coupled in respective pairs via respectively configured row coupling paths of section 1a and respective output column conduction paths in section 1b to provide for transfers of desired "shifted" output data representations in respectively associated latches 1b1. The activated column conduction paths in 1b are coupled exclusively to singular respective row conduction paths during such operations due to the shift control arguments used and the logic array construction.

3b. Holding

A special case of shifting is circulation of a data bit signal (or signals) from a latch (or latches 1b1) through the logic array into the same latch (or latches) 1b1. In such operations (termed "holding"), the logic array and associated inter-array conduction paths are effectively employed as recirculating delay or storage network(s). 3c. Logical ANDing FIG. 8 indicates that logical ANDing of two (or more) "AND arguments" is executed by controlled NOR translation of input signals representative of the logical inverses of the AND arguments through a suitably configured row conduction path of array 1. Preparation of this path is by one or more of the input argument signals. The outcome is a signal transferred to respectively coupled columns of array section 1b representative of the AND of the input signals.

3d. Exclusive OR

Figure 9:
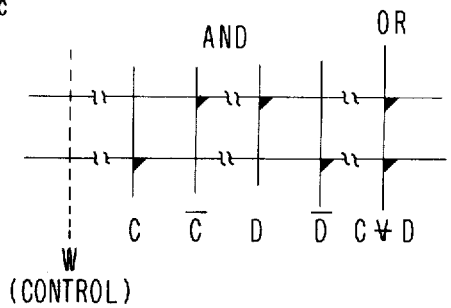

FIG. 9 shows that the logical Exclusive OR of two or more input arguments (in general selected logical sum of selected logical products) is obtained utilizing two or more appropriately patterned rows of the array. Each of these rows has couplings patterned to form a logical product of the inverse of an associated one of a group of input "data" arguments with true representation(s) of the other "data" argument(s) of the group. The row (product) functions are logically summed (OR'd) in an appropriately coupled (and, if relevant, positioned) column of array section 1b, which provides an output representative of the Exclusive OR of the grouped inputs.

3e. Counting

Figure 10:
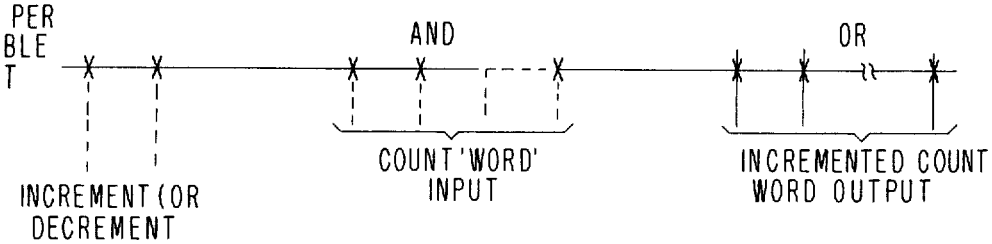
Figure 11:
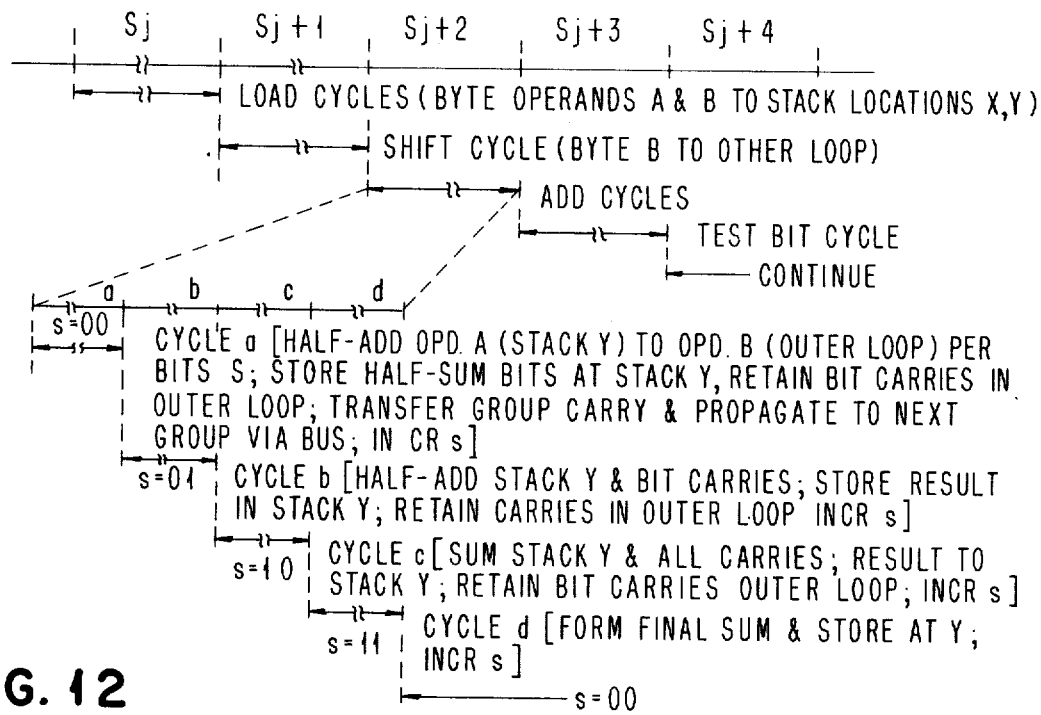
FIG. 11 illustrates autonomous sequencing of a typical subject module organized for byte processing in cooperation with other autonomous modules, whereby 4 byte words are additively manipulated in 4 modules with inter-module carry information transfer.

FIG. 10 shows that information representing a count may be incremented (or decremented) by translation through a "matching" logic array row having select output couplings to OR array columns positioned according to the desired incremented (or decremented) count value.

3f. Addition

An organizational structure for combining plural cyclic operations to accomplish autonomous addition of two word operands is explained with reference to FIGS. 1–11. By extension organizations for similar operations of multiplication, division, matrix manipulation, etc. will be understood.

Four modules connected via a multi-conductor bus autonomously perform addition operations on pre-loaded denominationally ordered byte (quarter-word) segments of augend and addend words. Group (byte) carry and group propagate signal functions are exchanged between modules via the bus. Received group functions are used selectively by recipient modules to form full addition result bytes.

Augend and addend bytes to be added are pre-loaded into each module together with initial control intelligence defining byte denominational order. The source of such intelligence typically would be another module communicating with the adding modules via the external bus. Initial control provides for selection of EXTERNAL IN gates (FIG. (1) of individual adding modules, selection of STACK loading addresses and selection of an initial OUTER LOOP control signal state for initiating the desired autonomous operation. When the four adding modules have been loaded (e.g. in eight externally controlled loading cycles) they may proceed concurrently under autonomous control to carry out addition operations on respectively stored bytes.

An external "go-ahead" signal given to all adding modules is translated through arrays 1 into initial OUTER LOOP control signals serving to initiate associated autonomous sequences in respective modules. The following sequence of operations occurs in each module:

a. one of the bytes to be added (e.g. the augend byte) is retrieved from the STACK and shifted (FIG. 7) through the logic array into selected latches 1b1 interfacing with the OUTER LOOP (FIG. 1). Simultaneously next cycle sequence control factors $f$, $s$, $A$, . . . (including control initiating intelligence related to the denominational orders of respectively loaded bytes) are established in outer loop latches 1b1 (the requisite initial control factors and STACK addressing functions for accomplishing these operations having been previously received; e.g. by translation of the previously given external "go-ahead" at CLB-CLC of the previous cycle). The translation to next cycle control may include counting modification of one or more sequence control count factors (e.g. "$s$" may be incremented), accomplished by translation of the factor digits through logic array rows patterned according to the required counting algorithm (FIG. 10).

b. In the next cycle (cycle $b$, FIG. 11) the addened byte is fetched from the STACK to the INNER LOOP and additively combined (Exclusive OR'd) bit for bit with the augend byte circulating in the OUTER LOOP. At CLD of this cycle the half-add result is stored in the STACK space ($y$) vacated by the addend byte and the bit carries are positioned to replace respective augend bits at the OUTER LOOP interface 1b1. Also at CLD group (byte) carry and group propagate signal functions, developed and latched in other OUTER LOOP interface latches 1b1, are gated to external bus conduction paths associated with the denominational byte handling orders originally assigned to respective modules. The control status of the OUTER LOOP is translatively modified in this cycle for next cycle control.

Assuming that bytes have eight bits and STACK registers hold 32 bits, in many systems it will be feasible to load the addend and augend bytes into one-half of a STACK register and simultaneously retrieve the two bytes for half addition exclusively thru the INNER LOOP path. When this is feasible step a) above may be eliminated.

c. In the next cycle (cycle c, FIG. 11) the half-add result bits are added to respectively ordered bit carries. The lowest order half-add result bit is selectively augmented as a function of the group propagate and group carry information received via the bus from lower order modules (these being implicitly ordered by virtue of their conduction path positions on the bus). The augmented partial result is stored in the STACK space vacated by the half-add result. Bit carries resulting from this cycle are preserved in the OUTER LOOP positions vacated by the previous bit carries and OUTER LOOP control factors for this cycle are translated into factors appropriate for next cycle control.

d. In the next cycle (cycle d, FIG. 11) the "full add" final result is formed by bit-wise parallel addition of the retained bit carries and the last stored partial result. The final result is stored in the STACK space vacated by the previous cycle partial result and each module gates out completion signal on a separate external bus conduction path associated with the respective byte order assignment of the module. Current cycle control is selectively translated into next cycle control utilizing condition status information supplied through the "CONDITIONS, STATUS & INTERRUPTS" conduction paths (in effect a "conditional branch" is taken).

3g. Interruption

Figure 12:
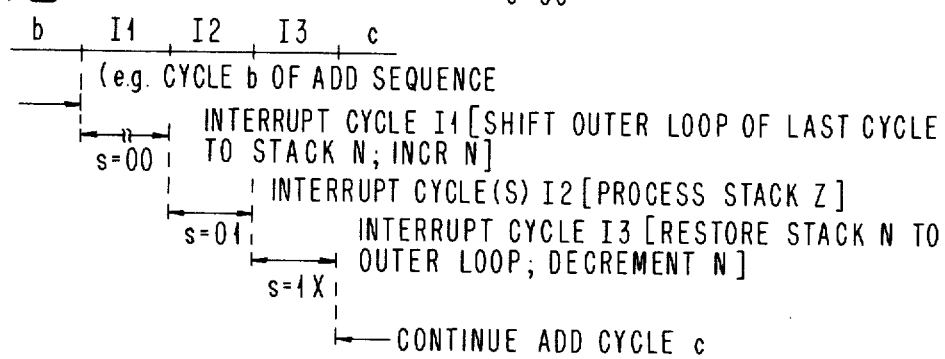
FIG. 12 illustrates interruption operation sequencing of a subject module.

FIG. 12 shows how interruption of autonomous sequencing is carried out and how plural interruptions may be hierarchically nested. With each interruption OUTER LOOP signal conditions (status) established at CLC of the last cycle of interrupted activity are stored (saved) in a predetermined STACK address location associated with the nesting count factor N. The saved status is subject to subsequent retrieval and re-alignment in respective OUTER LOOP positions for causing the interrupted action to be resumed without loss of function. The operational sequence is as follows:

a. Upon responsive recognition (logical translation) of a condition (external or internal) requiring interruption of a current activity, OUTER LOOP signal status [including the STACK address code signal at 2a (FIG. 1)] is stored (saved) in a predetermined STACK address and a signal (or signals) is (are) given to reset the condition causing the interruption. The saving address is determined in association with an incremented nesting count factor N, which is incremented when the interruption is initiated and decremented when the interrupting activity is completed. The number of module cycles needed to complete the status saving and incrementing of N depends principally upon the size (bit length) of the OUTER LOOP field which must be saved.

The interrupted activity may itself be a "nested" interruption of another activity (FIG. 12) or it may be an original activity (level N = O) such as a stage of the addition process previously described. The logic of array 1 relative to accepting interruption or nested interruption could easily be prioritized (by patterning of appropriate cross-points) so that not all activities would be interruptible prior to a given cyclic stage of their completion.

The status saving action is accomplished by translating the signal representing the interrupting condition (when permissible) into "next cycle interrupt control" status at suitable vacant OUTER LOOP conduction path interface positions, while the action normally initiated in this cycle is completed. In the next cycle N + is "generated" into STACK interfaces 2a by translation of current status (control) signals representative of N. Concurrently normal "next cycle" STACK address is shifted into the write-in path interface between 1b1 and the STACK. Concurrently up to 29 other normal next cycle control status bit signals may be shifted into this path and saved together with the normal next address. Alternately, several cycles of holding and shifting (and STACK address manipulation) may be used to simplify the saving shifts or to accommodate the saving of more than thirty-two status bits.

b. While the saving operation(s) is (are) executed the OUTER LOOP control factors are concurrently translated into control signals suitable for initiating the first cycle of processing activity for which the interruption was taken (for example, testing of a possibly erroneous addition operand or result bit utilizing, a "masking" row in the logic array to select the desired bit).

c. Upon conclusion of the interruption processing activity assuming that further interruption have not been taken) N is decremented and saved status of the interrupted activity is restored by reverse shifting of the saved bits relative to interface 1b1 (i.e. status of the next lower ranked interruption process is restored if the decremented value of N is not zero or status of a lowest ranked data processing activity is restored if decremented N is zero) to produce the parallel signal states at 2a and other OUTER LOOP positions required for continuation of the interrupted activity. If necessary or desirable one or more "holding" operations may be employed in a piecemeal (plural cycle) re-alignment of the saved status functions.

3h. Conditional Branches

Logic array rows may be configured to condition branch sequence selection of next cycle control upon conditions manifested either externally (at the EXTERNAL IN gating interface, FIG. 1) or internally (at the INTERNAL CONDITIONS, AESETS . . . interface, to array 1a, (FIG. 1). For this purpose the conduction paths conveying such conditions are coupled to translation rows of array 1 arranged to responsively translate the manifested condition (or combination of conditions) into appropriate OUTER LOOP control status for effecting the desired sequence branch. Discrete CONDITION latches separate from array latches 1B1 may be used to retain separately occurring conditions for combinational influencing of branch selection.

3i. Waiting/Idling

Holding shifts of OUTER LOOP states may be used to provide waiting or idling cycles of operation (e.g. to enable several modules to coordinate a distributed processing operation). Logic array rows may also be patterned to permit maintenance of condition signals in selected OUTER LOOP conduction paths concurrent with other logical processing operations for controlling conditional branching (see "Holding" supra).

3j. Resets

Reset operations "clear" the STACK (zeros written into predetermined STACK locations) and establish initial idling conditions in the OUTER LOOP preparational to conditional branching to specific processing sequence action.

4. Multi-module Configurations

Multiple modules of the form described above may be interconnected via a common bussing highway to provide either distributed processing capability or switchable configurations for circumventing faulty module constructions.

Figure 13:
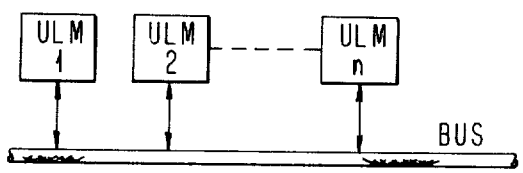
FIG. 13 illustrates a multi-module network.
Figure 14:
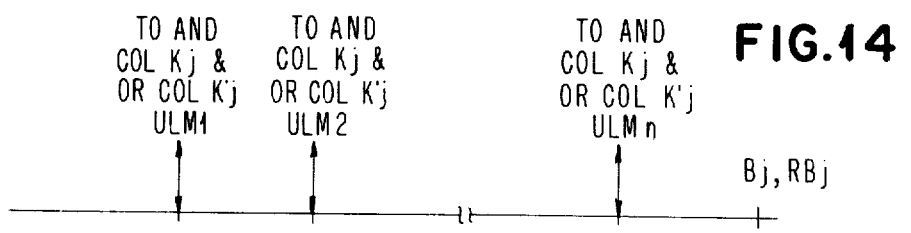
FIG. 14 indicates use of redundant bussing elements to circumvent faulty internal operational elements of modules.

Individual conduction paths $B_j$ of the bus connect (FIGS. 13, 14) via corresponding EXTERNAL conduction path gating elements to corresponding input or output coordinate column conduction paths in each module ULMi. For each "original" bus conduction path element $B_j$ there may be provided a corresponding redundant element $RB_j$ (FIG. 14) subject to switched selection relative to $B_j$ in each module. In each module the switch path associated with a redundant bus element may be made connectable to redundant column and row elements of the respective logic array and the latter may be structured to duplicate the functions of column and row elements connectable to $B_j$; whereby a fault contained in a module conduction path associated with $B_j$ can be circumvented, without altering the module function in respect to the malfunctioning path. The connection path selection may be accomplished manually during production testing of modules. Thus, by means of such redundant constructions and switching the module manufacturing process may be made fault tolerant; so that imperfect modules may be used.

5. Multiple Addressing of Stack

It may be useful in some module configurations to provide plural signal paths to the address selection controls of the STACK with switching circuits to select between these paths in each cycle. Thus, the STACK addressing path (2a, FIG. 1) may be adapted to receive addressing stimuli from a selected one of several sources. These may include various different output fields of array section 1b, external input gates, and internal condition latches. Other selective addressing configurations will be apparent.

Naturally in a module with alternate addressing paths, control of path selection requires additional circuitry but simplifies the control of address status storage in respect to interruption.

6. Testing of Modules

In a multi-module network as discussed above the individual modules may be tested remotely. The test organization is as follows:

A single test is generated to select a module and verify its operation. This test determines whether every bistable device can be set to both 0 and 1 states, and whether the words in the logic array operate correctly; e.g. that the array performs the sum of products correctly. The test may access several logic words in parallel, provided there is unique differentiation of each word tested in the OR-array output. When plural modules are logically identical and interconnected by a common bus the same test sequence can be performed sequentially for each module, and the checking of the results of the tests can be performed by comparing results produced by different modules. Majority logic can be used to identify the source of any error. Common failures like bus failures may be verified by external hardware (oscilloscopes).

7. Module Fabrication a. Read Only Logic Array/Writeable STACK

When the logic arrays have read-only structuring the modules may be identically handled in manufacture to form the STACK, the logic array structures other than crosspoint couplings, the inter-array internal conduction paths, the EXTERNAL IN and EXTERNAL OUT connection interfaces, the internal condition manifesting elements, and so forth. The process of manufacture may be any of the many well known LSI manufacturing processes in use today.

The logic array cross-point couplings in particular rows may be made identical for all modules in a given line of modules. For instance if all such modules will have interruption capability the logic array rows providing the requisite logical shifting and STACK addressing functions may be identically located and formed in all modules.

This leaves only the specialized functions (numerical arithmetic, matrix arithmetic, editing, sorting, etc.) to be implemented by specialized manufacturing handling of individual modules (or sets of modules). In such individualized handling crosspoints of logic array rows designated by the logic designer are given specialized cross-point coupling "personality" by means of specialized masks or selective step-and-repeat process handling.

b. Writable Logic/Writable STACK

By incorporating additional storage and gating structures at each logic array row cross-point, the logic array would be "writable" for "slow write/fast read" usage and the manufacturing process would be standardized for all modules. However, the personalization (slow write) of individual modules would require specialized program back-up and the expense of the additional structures would not be inconsequential. To some extent, however, these disadvantages could be offset by the additional flexibility offered by such modules.

8. Miscellaneous Module Organizations and Constructions

Writable logic arrays may be constructed using state of the art bipolar OR FET technology. The function of the AND array is achieved by using a conventional storage bistable device with additional logic for the NOR operation.

Read-only logic arrays can be achieved by provision of permanent unidirectional coupling devices or elements at the array cross-points. These devices may be diodes or transistors formed either selectively at selected cross-points during a masking stage in the fabrication process or at all cross-points subject to being open curcuited selectively after fabrication processing (e.g. by electrical or laser techniques). FET or bipolar transistors may be "personalized" selectively by varying the gate thickness (for FET devices), or the metalizing mask (for both FET and bipolar).

The logic design principle is based upon expressing desired primitive logic functions as sums of products. The structure of the universal logic module relies upon its logic capability to perform higher levels of functions by sequential autonomous operation. The design procedure requires the mapping of the primitive functions into the array row cross-points with feedback from the OR-array providing sequential control of selection of those primitives. This requires a control field (column)

associated with the "addressing" of each primitive function. If necessary to define control fields that select combinations of primitives simultaneously this can be achieved by using "dont-care" translational states in the AND array positions associated with addressing of such primitives. Selection of sequences is based upon provision of control field(s) which uniquely identify the sequence as well as individual sequence stages.

Conclusion

From the foregoing description it may now be appreciated that the described module provides the basis for providing families of identically dimensioned and identically organized array logic modules having autonomous operation control capability and providing a wide variety of different operations, within limits imposed by the dimensions chosen for the logic and storage array and the predetermined inter-array internal connections. Array dimensions are subject to selection, for a given family or line of modules, as a function of the available technology for large scale integration and the range or repertoire of useful functions contemplated for the complete line.

While the invention has been particularly shown and described with reference to preferred embodiments thereof, it will be understood by those skilled in the art that various changes in form and detail may be made therein without departing from the spirit and scope of the invention.

What is claimed is:

1. Interconnected logic array and addressible storage array matrix elements in a cyclically operative modular unit, wherein the logic array and interconnections thereof with said storage array are configured to permit said unit to be operated autonomously over plural cycles of operation relative to data stored in said storage array, said elements and interconnections comprising:

first and second and third input conduction paths for cyclically presenting input signals to said logic array in parallel form;

first, second and third output conduction paths for cyclically transferring outputs from said logic array;

addressing lines coupled switchably between said first output path and address selection circuits of said storage array for selecting one of plural word locations in said storage array under control of addressing information variously shifted through said logic array;

storage write-in lines coupled switchably between said second output path and said storage array for transferring information signals from said second output path into said addressed word location for temporary storage over an arbitrary number of consecutive cycles of operation of said unit;

storage read-out lines coupled switchably between said storage array and said first input path in an INNER LOOP circuit, for transferring stored information from a said addressed location into said logic array as a partial input of a unit cycle;

means switchably connecting said second input path with said third output path in an OUTER LOOP circuit, for permitting a portion of the logic array output in one cycle of said unit to be presented as a partial input to the logic array in the next cycle; and means connecting with said third input and output paths for providing gated external access to said logic array for conducting external input and output relative to said unit.

2. An array structured modular unit according to claim 1 wherein said elements and interconnections are integrally co-packaged together with cycle timing circuits in one large scale integrated circuit, said timing circuits serving to supply signals in each said cycle for conditioning said elements of said modular unit for time-staggered operation within each cycle.

3. A unit according to claim 1 including integrally co-packaged condition bit storing elements separate from said matrix elements and interconnected switchably in parallel with said OUTER LOOP; said condition storing elements being useful for receiving, holding and re-circulating condition signals produced by said logic array element as selection control stimuli to said logic array element for controlling said autonomous operations of said modular unit.

4. A modular unit according to claim 1 having autonomous interruption handling operations wherein said storage element is operated to store and re-circulate information representing outputs of said logic array requisite to recovery of an interrupted operation; said requisite information including current said addressing information; said interruption handling operations provided by parts of said logic array effective in successive cycles: (a) to shift said requisite information through said OUTER LOOP circuit and logic array onto said write-in lines of said storage array to effect saving storage of corresponding information in predetermined saving locations of said storage array element; (b) to shift new addressing information designating said saving location from said OUTER LOOP to said addressing lines in coordination with said write-in shift of said requisite information,; and c) to re-circulate said requisite information to re-position signal representations thereof concurrently in parallel in respective said output conduction paths from which said signals were originally shifted into said saving locations, thereby causing an interrupted operation sequence associated with said saved information to be resumed at the point of interruption.

5. A modular unit according to claim 4 wherein said new addressing information is derived from a nesting count factor N stored in said logic array by repeated circulation through said OUTER LOOP and incremented by said logic array while being shifted onto said addressing lines and thereafter decremented while said requisite information is being re-circulated and repositioned; said incremented count factor being used thereby to determine said saving location in said storage array which is to be used for retaining said requisite information.

6. A modular unit according to claim 5 wherein said interruption handling operation may be repeated before said recirculation and repositioning to permit interruption of the interrupting operation characterized by additional locations in said storage array for saving of additional status signals, said additional locations addressable by further increments of said nesting count factor.

7. A modular unit according to claim 1 wherein said storage array element is a read/write stack of plural word registers having common write-in conduction paths connected to said write-in lines, common read-out conduction paths connected to said read-out lines and common address decoding circuits connected to said output conduction path of said logic array element for cyclically: receiving and decoding coded address selection information supplied to said first output path by said logic array element, storing data signal representations shifted to said write-in lines by said logic array element at word locations designated by the address selection information and reading out said stored signal representations from said designated locations to said read-out lines.

8. A modular unit according to claim 7 wherein said write-in and read-out paths together with associated parts of said logic array form said INNER LOOP circuit permitting cyclic transferral of signals in shiftable parallel groups from said logic array outputs to said designated locations of said storage array and from said designated storage array locations back into and shiftably through said logic array.

9. A unit according to claim 8 wherein said addressing lines are connectable switchably into said OUTER LOOP and thereby shiftable into said write-in conduction paths of said storage array, whereby said unit is able to effect saving and restorative manipulations of said address selection information enabling said unit to interrupt one sequence of operations, perform other operations, and then resume the one interrupted sequence.

10. A unit according to claim 7 wherein said logic array is a read-only store matrix having permanently stored logical couplings at crosspoint coordinate positions thereof representing permanently stored bits of translation selection information, said matrix having overall coordinate dimensions such that the number of such permanently stored bits of information is considerably greater than the total bit storage capacity of said storage array.

11. An array structured universal logic module capable of autonomous data storage and processing operation comprising:

plural integrally co-packaged circuit elements arranged in ordered matrix arrays having standard dimensions and varied functional capability, said elements including a multi-coordinate logic array element having read-only construction, a random access read/write storage array element having plural word locations and common address selection circuits, and plural distinct groups of cyclically operable signal gating and conduction line elements arranged to provide multiple parallel conduction paths relative to said logic array and storage array elements, said groups including:

a group of EXTERNAL IN conduction elements for switchably conveying plural input signals in parallel relation to an associated first group of input lines of said logic array from apparatus external to said module;

a group of EXTERNAL OUT switchable conduction elements for conveying plural output signals in parallel relative to an associated first group of output lines of said logic array to apparatus external to said module;

a group of cyclically enabled signal gating and conduction elements forming an OUTER LOOP feedback circuit for conveying signals in parallel from an associated second group of output lines of said logic array to an associated second group of input lines of said logic array, thereby providing for cyclically recirculating signals for iterative logical manipulation by said logic array;

a group of storage write-in signal gating and conduction elements for transferring signals in parallel from an associated third group of output lines of said logic array for storage in said storage array;

a group of storage read-out signal gating and conduction elements completing an INNER LOOP circuit for transferring stored information signals in parallel from said storage array to an associated third group of input lines of said logic array; and a group of signal gating and conduction elements for conveying address information signals in parallel from a sub-group of said second group of output lines of said logic array to said common address selection circuits of said storage array for controlling selection of storage addresses relative to said write-in and read-out elements.

12. An array structured logic module according to claim 11 including integral timing circuits co-packaged with said elements in one large scale integrated circuit unit, said timing circuits being useful to supply cyclic clocking signals to said gating elements for partially enabling said gating elements.

13. A module according to claim 11 including a group of integrally co-packaged CONDITION LATCH bit storage elements connected between between respective lines of said logic array in a fourth group of output lines and a fourth group of input lines; said CONDITION LATCH elements being useful to store status signals representing conditions variously occurring during cyclic operations of said logic array and to supply said stored status signals as sequence control stimuli to input lines of said logic array for controlling associated sequences of operation of said module.

14. A module according to claim 13 wherein said logic array is conditionally responsive to signals supplied by said EXTERNAL IN AND CONDITION LATCH elements to perform a sequence of internally controlled interruption handling operations for accomplishing: (a) shifting of control and data information from said OUTER LOOP circuit and fourth group of input lines to said write-in elements said information in predetermined saving spaces of said storage array; (b) shifting of other data and control information previously stored in said storage array into said CONDITION LATCHES and OUTER LOOP circuit for initiating an interrupting operation or task; and (c) read-out of said stored information from said saving spaces into said CONDITION LATCHES and OUTER LOOP to re-position parallel signal representations of said saved information at respective lines at which said information originated prior to being saved, thereby causing the interrupted operation associated with said saved information to be resumed at the point of interruption.

15. A module according to claim 14 wherein said other information associated with said interrupting operation includes a nesting count control factor repeatedly circulated in said logic array and OUTER LOOP, and selectively incremented and decremented by operations of said logic array; said factor being incremented in value and applied to said address selection circuits to designate the location of said spaces in said storage array, then maintained at said incremented value while said interrupting operation is performed and then decremented in value and re-applied to said address selection circuits to re-designate the locations of said saving spaces in said storage array for said resumption of said interrupted operation.

16. A module according to claim 15 wherein the said interrupting operation can be interrupted before completion by a further interruption handling operation which includes in sequence: further incrementing of said nesting count factor, saving of other status stimuli in storage array address locations designated by said further incremented factor, performance of other interrupting operations, decrementing of said further incremented factor, and repositioning of signal representations of said other saved status stimuli in parallel at respective logic array output coordinates to control resumption of said first mentioned interrupting operation at the point of interruption thereof.

17. A module according to claim 11 wherein said storage array is a read/write stack of plural registers having common write-in conduction paths, common read-out conduction paths and common decoding circuits in said common address selection circuits, all connected to respective lines of said logic array and thereby operable for receiving and decoding coded address selection stimuli supplied from said sub-group of said second group of output lines of said logic array, temporarily storing output signal stimuli received shiftably from said logic array over plural cycles of operation of said logic array, in storage spaces designated by said coded address stimuli, and supplying stored stimuli to said group of storage read-out elements from storage spaces designated by said coded address stimuli.

18. A module according to claim 17 wherein signals representing said coded address selection stimuli are transferred through said EXTERNAL LOOP into said logic array and subject thereby to being conditionally shifted in said logic array over to said write-in elements of said storage array, thereby enabling said logic array to effect saving storage and restorative positioning of said address selection stimuli relative to said common decoding circuits in arbitrary cycles of operation of said module and enabling said module to accomplish autonomous interruption and resumption of operations thereof.

19. A module according to claim 11 wherein the numbers of bits represented by the totality of read-only crosspoint couplings in said logic array is much greater than the total bit storage capacity of said storage array.

20. In a distributed processing network in combination:
a plurality of array structured universal logic modules having internal storage and cycle timing circuits enabling said modules to perform data storage and processing operations autonomously and asynchronously; said modules having identically dimensioned multi-coordinate logic arrays, identically dimensioned and structured random access storage arrays, identically formed signal conduction and gating line circuits interconnecting said arrays internally, and EXTERNAL IN and EXTERNAL OUT line connections to said logic array for providing external access to the respective module; said network including a multi-conductor external bus connected to each of said modules; said bus having multiple input and output conductors; each input conductor of said bus coupling to an associated EXTERNAL IN line of the logic array in each of said modules; each output conductor of said bus coupling to an associated EXTERNAL OUT line in each module; the logic array coordinates associated with individual said bus conductors having corresponding positions in all modules.

21. A network of modules interconnected by a bus according to claim 20, wherein said storage array elements are much smaller in size than said logic array elements, and said conduction and gating circuits include INNER LOOP and OUTER LOOP connection elements; said OUTER LOOP elements being subject to cyclic energization to provide for circulatory transfer of signals between predetermined output and input line coordinates of said logic array; said INNER LOOP elements permitting transfers of signals between other predetermined coordinates of said logic array and said storage array, said storage array having sufficient capacity to permit respective modules to operate autonomously for plural cycles of operation without external stimuli on said bus.

22. A network according to claim 21 wherein said elements of individual said modules are integrally co-packaged together with cyclic clocking circuits in one large scale integrated circuit unit laid out in an ordered matrix, said clocking circuits and bus serving to supply signals for initiating and controlling cyclic operation of said modules over plural cycles of action.

23. A network according to claim 22 each module including integrally co-packaged condition storing elements having selective connection to certain of said predetermined output and input line coordinates of the respective said logic array, said condition storing elements being useful to store plural conditions variously occurring at random during cyclic operations of the respective said logic array and to supply sequence conditioning stimuli to said respective logic array for initiating associated sequences of operation of respective said modules.

24. A network according to claim 23 wherein each said logic array is structured internally to be able to react both to external control stimuli supplied through said bus and respective said EXTERNAL IN lines and to internal control stimuli supplied through said INNER and OUTER LOOP circuits and from said condition storing elements; the reactions of said logic arrays to respective control stimuli ranging over a repertoire of actions including autonomous interruption actions, said interruption actions characterized by successive operations causing: (a) write-in transfers of address control and data status stimuli within INNER and OUTER LOOP circuits of respective modules into and out of predetermined address spaces of respective storage arrays, thereby causing said respective stimuli to be saved in said predetermined address spaces; (b) read-out transfers of other previously stored information stimuli from respective said storage arrays to respective logic arrays for initiating an interrupting operation or task extending over plural cycles; and (c) subsequent readout transfer of said stimuli from said predetermined address space to re-position signal representations of said stimuli in parallel at output line coordinates of the respective logic array in the form of said stimuli prior to said write-in into said predetermined address space, thereby causing interrupted activities of respective modules to be resumed.

25. A network according to claim 24 wherein said other stimuli associated with said interrupting operations include a nesting count control factor which is subject to being incremented in value by the respective logic arrays and used to designate said predetermined address space for write-in, then held while said respective interrupting operation is being performed, then re-used to designate said predetermined address space for read-out, and then decremented in value.

26. A network according to claim 25 wherein respective said interrupting operations may be further interrupted before completion by repetitions of said write-in, read-out and subsequent read-out giving rise to a further interrupting operation in the respective module, said repetition including: further incrementing of the respective nesting count factor, further saving of interrupted status stimuli in respective storage array locations designated by said further incremented factor, performance of other interruption manipulation operations, decrementing of said further incremented respective factor, and repositioning of said further saved interrupted status stimuli to control resumption of said first mentioned interrupting operation at the point of interruption thereof.

27. A network according to claim 21 wherein said storage array of each module is a read/write stack of addressible registers having common write-in connections to associated output coordinates of respective logic arrays, common read-out connections to associated input coordinates of respective logic arrays, and common address decoding circuits connected to associated OUTER LOOP circuits of said respective logic array for receiving coded address information from said array, said common connections and decoding circuits being operated cyclically: to selectively store output signals of said respective logic array in registers of the respective storage array designated by said coded address information supplied through said logic array, and to selectively supply stored signals as input signal stimuli to said logic array from registers designated by said address information.

28. A network according to claim 27 wherein said coded address outputs of individual said logic arrays are coupled to said OUTER LOOPS as feedback inputs into respective said logic arrays subject to being conditionally shifted in said respective logic arrays to said write-in connections of respective storage arrays, whereby said logic arrays are able to operate autonomously to effect saving and re-positioning manipulation of any said coded address output in any cycle of operation of the respective module, and thereby enabling the respective module to operate autonomously to interrupt a sequence of cyclic actions relating to one operation of an arbitrary cycle stage before completion of said one operation, perform other operations and then continue the interrupted operation at the correct cycle stage when the other operations have been completed.

29. A network according to claim 27 wherein said logic arrays have read-only crosspoint coupling constructions representing permanently stored bits of logical coupling information and overall array dimensions such that the number of such bits of permanently stored information is considerably greater than the total bit storage capacity of said storage array.

30. A network according to claim 21 characterized in that the logic arrays have read-only construction and the storage arrays have read/write construction and are formed on the same substrates as respective logic arrays.

31. A network according to claim 30 wherein all array and circuit elements of individual said modules are integrally co-packaged on said same substrate together with clocking circuits useful to supply cyclic clocking signals for cyclically activating respective said array interconnecting circuits and thereby conditioning said respective module for cyclic operation.

32. A network according to claim 31 each module including integrally co-packaged condition latch storing elements having connection to certain of predetermined output and input line coordinates of the respective logic array said condition latches being useful for storing information representing output conditions of the respective logic array variously occurring at random during any cycle of operations of said respective logic array and for supplying said stored information to said respective logic array in a subsequent cycle for initiating associated sequences of operation of the respective module.

33. A network according to claim 32 wherein each said module logic array is structured to be able to respond both to external conditioning stimuli supplied through said EXTERNAL IN connections and internal conditioning stimuli received through said INNER LOOP and OUTER LOOP and from said condition latches; said logic arrays having capability to use respective storage arrays to save status information and thereby to perform autonomous interruption sequences characterized by successive operations of: (a) shifting control and data status stimuli through respective OUTER LOOP circuits into respective storage arrays, causing said respective status stimuli to be saved in predetermined address spaces of respective said storage arrays; (b) shifting previously saved other data and control stimuli out of respective said storage arrays and through the INNER LOOP and logic array to initiate an interrupting operation or task; and (c) restorative shifting of said saved status stimuli out of said storage array and through said INNER LOOP and logic array to reposition signal representations of said saved stimuli in parallel at the respective output coordinates of the respective logic array at which said saved stimuli originated prior to being saved, thereby causing interrupted activities of respective modules to be resumed.

34. A network according to claim 33 wherein said respective other control stimuli associated with respective said module interrupting operations include respective count control factors which are subject to being manipulated by the respective said logic arrays to be incremented in value prior to respective said saving manipulation, then held while said respective interrupting operation is being performed and then decremented in value just prior to completion of respective said status repositioning manipulation; said incremented count factor being used to determine the location in the respective storage array used for saving said respective status stimuli.

35. A network according to claim 34 wherein respective said interrupting operations may be further interrupted in each module by other interruption conditioning stimuli giving rise to associated other interrupting operations in the respective modules, which include in sequence: further incrementing of the respective nesting count factor, further saving of other interrupted status stimuli in respective storage array locations designated by said further incremented respective factor, performance of other interruption manipulation operations, decrementing of said further incremented respective factor, and repositioning of said other saved interrupted status stimuli to control resumption to said first mentioned interrupting operation at the point of interruption thereof.

36. A network according to claim 30 wherein said storage array of each module is a read/write stack of addressible registers having common write-in conduction path connections to associated output coordinates of respective logic arrays, common read-out conduction path connections to associated input coordinates of respective logic arrays, and common address decoding circuits, said common path connections and decoding circuits operating cyclically: to store output signals of said respective logic array in registers of the respective storage array selectively determined by decoding of address code outputs of said logic array, and to supply stored signals as input signal stimuli to said logic array from registers designated by said decoded address code outputs of said logic array.

37. A network according to claim 36 wherein in each cycle of operation of each said module said store and supply operations are performed consecutively; first the supply operation and then the store operation.

38. A network according to claim 37 wherein said coded outputs of individual said logic arrays are subject to being transferred back into respective said logic arrays and to being shifted in said respective logic arrays relative to said write-in connection paths of respective storage arrays, whereby said logic arrays are able to operate autonomously to effect saving and re-positioning manipulation of said address selection stimuli, during arbitrary cycles of operation of the respective modules, enabling the respective module thereby to operate autonomously to interrupt an operating sequence at an arbitrary cycle stage of operation, perform other operations and then continue the interrupted operation in the correct sequence order when the other operation has been completed.

39. A network according to claim 36 wherein said logic arrays have read-only constructions representing permanently stored bits of logical coupling information at individual coordinate positions thereof and overall array dimensions such that the number of such bits of permanently stored information is considerably greater than the total bit storage capacity of said storage array.

40. A network as in claim 21 having redundant conduction elements in the external bus and corresponding redundant EXTERNAL IN gating and conduction elements in each said module, each said bus conduction element being subject to being paired with a said redundant bus conduction element for externally switched selection relative to each said module; said logic arrays having redundant logic positions for using said corresponding redundant EXTERNAL IN elements to provide redundant logical translation operations relative to the redundant bus conduction element whereby switching between respectively paired redundant conduction elements and conduction elements of the bus relative to a said module is useful to accomplish fault circumvention in the module without impairment of module functions.

41. A network according to claim 40 wherein all array and circuit elements of individual said modules are integrally co-packaged on one substrate together with clocking circuits useful to supply cyclic clocking signals for cyclically activating respective said array interconnecting circuits and thereby conditioning said respective module for antonomous operation.

42. A network according to claim 41, each module including integrally co-packaged condition storing elements having connection to certain of predetermined output and input coordinates of the respective logic array for use in storing associated output conditions of the respective logic array variously occurring at random during cyclic operations of said respective logic array and for use in supplying conditioning input stimuli to said respective logic array for initiating associated sequences of operation of the respective module.

43. A network according to claim 42 wherein each said module logic array contains shifting logic to be able to couple said storage array with said EXTERNAL IN, EXTERNAL OUT and OUTER LOOP circuits; whereby said modules can be externally primed to perform series of operations autonomously; including interruption sequences characterized by successive operations of: (a) autonomous manipulation of control and data status stimuli of respective modules relative to output coordinates of respective logic arrays causing said respective status stimuli to be saved in predetermined spaces of respective said storage arrays; (b) autonomous manipulation of respective other data and control stimuli relative to respective said storage arrays for accomplishing an interrupting operation or task; and (c) autonomous manipulation of said respective saved status stimuli to re-position parallel signal representations of said saved stimuli at the respective output coordinates of the respective logic array at which said saved stimuli originated prior to being saved, thereby causing interrupted activities of respective modules to be resumed.

44. A network according to claim 43 wherein said respective other control stimuli associated with respective said module interrupting operations include respective count control factors which are subject to being manipulated by the respective said logic arrays to be incremented in value prior to respective said saving manipulation, then held while said respective interrupting operation is being performed and then decremented in value just prior to completion of respective said status re-positioning manipulation; said incremented count factor being used to determine the location in the respective storage array used for saving said respective status stimuli.

45. A network according to claim 44 wherein respective said interrupting operations may be further interrupted in each module by other interruption conditioning stimuli giving rise to associated other interrupting operations in the respective modules, which include in sequence; further incrementing of the respective nesting count factor, further saving of other interrupted status stimuli in respective storage array locations designated by said further incremented respective factor, performance of other interruption manipulation operations, decrementing of said further incremented respective factor, and repositioning of said other saved interrupted status stimuli to control resumption of said first mentioned interrupting operation at the point of interruption thereof.

46. A network according to claim 40 wherein said storage array of each module is a read/write stack of addressible registers having common write-in conduction path connections to associated output coordinates of respective logic arrays, common read-out conduction path connections to associated input coordinates of respective logic arrays, and common address decoding circuits, said common path connections and decoding circuits operating cyclically: to store output signals of said respective logic array in registers of the respective storage array selectively determined by decoding of address code outputs of said logic array, and to supply stored signals as input signal stimuli to said logic array from registers designated by said decoded address code outputs of said logic array.

47. A network according to claim 46 wherein said address code outputs of individual said logic arrays are subject to being shifted through said OUTER LOOP and respective said logic arrays into said write-in connection paths of respective storage arrays, whereby said logic arrays are able to operate autonomously to effect saving and re-positioning manipulation of said address selection stimuli, during arbitrary cycles of operation of the respective modules, enabling the respective module thereby to operate autonomously to interrupt an operating sequence at an arbitrary cycle stage of operation, perform other operations and then continue the interrupted operation in the correct sequence order when the other operation has been completed.

48. A network according to claim 46 wherein said logic arrays have read-only constructions representing permanently stored bits of logical coupling information at individual coordinate positions thereof and overall array dimensions such that the number of such bits of permanently stored information is considerably greater than the total bit storage capacity of said storage array.

49. A network according to claim 21 for addition processing, including a plurality of byte handling modules organized to perform byte group addition functions autonomously and to exchange group carry and group propagate intelligence via autonomously selected conduction elements of said bus, enabling said modules to effect addition of addend and augend words by distributed parallel processing of correspondingly ordered addend and augend byte segments of said words.

50. A network according to claim 49 wherein all array and circuit elements of individual said modules are integrally co-packaged on said same substrate together with clocking circuits useful to supply cyclic clocking signals for cyclically activating respective said array interconnecting circuits and thereby conditioning said respective module for cyclic operation.

51. A network according to claim 50 each module including integrally co-packaged condition storing elements having connection to certain of predetermined output and input coordinates of the respective logic array for use in storing associated output conditions of the respective logic array variously occurring at random during cyclic operations of said respective logic array and for use in supplying conditioning input stimuli to said respective logic array for initiating associated sequences of operation of the respective module.

52. A network according to claim 51 wherein each said module logic array is structured to be able to respond alternately to external conditioning stimuli received through respective said input/output connection elements and internal conditioning stimuli received alternately from respective input coordinate connections to respective output coordinates and respective condition storing elements; the responses of said logic arrays to respective conditioning stimuli comprising initiation of autonomous interruption sequences characterized by successive operations of: (a) autonomous manipulation of control and data status stimuli of respective modules relative to output coordinates of respective logic arrays causing said respective status stimuli to be saved in predetermined spaces of respective said storage arrays; (b) autonomous manipulation of respective other data and control stimuli relative to respective said storage arrays for accomplishing an interrupting operation or task; and (c) autonomous manipulation of said respective saved status stimuli to re-position parallel signal representations of said saved stimuli at the respective output coordinates of the respective logic array at which said saved stimuli originated prior to being saved, thereby causing interrupted activities of respective modules to be resumed.

53. A network according to claim 52 wherein said respective other control stimuli associated with respective said module interrupting operations include respective count control factors which are subject to being manipulated by the respective said logic arrays to be incremented in value prior to respective said saving manipulation, then held while said respective interrupting operation is being performed and then decremented in value just prior to completion of respective said status repositioning manipulation; said incremented count factor being used to determine the location in the respective storage array used for saving said respective status stimuli.

54. A network according to claim 53 wherein respective said interrupting operations may be further interrupted in each module by other interruption conditioning stimuli giving rise to associated other interrupting operations in the respective modules, which include in sequence: further incrementing of the respective nesting count factor, further saving of other interrupted status stimuli in respective storage array locations designated by said further incremented respective factor, performance of other interruption manipulation operations, decrementing of said further incremented respective factor, and repositioning of said other saved interrupted status stimuli to control resumption of said first mentioned interrupting operation at the point of interruption thereof.

55. A network according to claim 49 wherein said storage array of each module is a read/write stack of addressible registers having common write-in conduction path connections to associated output coordinates of respective logic arrays, common read-out conduction path connections to associated input coordinates of respective logic arrays, and common address decoding circuits, said common path connections and decoding circuits operating cyclically: to store output signals of said respective logic array in registers of the respective storage array selectively determined by decoding of address code outputs of said logic array, and to supply stored signals as input signal stimuli to said logic array from registers designated by said decoded address code outputs of said logic array.

56. A network according to claim 55 wherein in each cycle of operation of each said module said store and supply operations are performed consecutively; first the supply operation and then the store operation.

57. A network according to claim 56 wherein said coded outputs of individual said logic arrays are subject to being transferred back into respective said logic arrays and to being shifted in said respective logic arrays relative to said write-in connection paths of respective storage arrays, whereby said logic arrays are able to operate autonomously to effect saving and re-positioning manipulation of said address selection stimuli, during arbitrary cycles of operation of the respective modules, enabling the respective module thereby to operate autonomously to interrupt an operating sequence at an arbitrary cycle stage of operation, perform other operations and then continue the interrupted operation in the correct sequence order when the other operation has been completed.

58. A network according to claim 55 wherein said logic arrays have read-only constructions representing permanently stored bits of logical coupling information at individual coordinate positions theerof and overall array dimensions such that the number of such bits of permanently stored information is considerably greater than the total bit storage capacity of said storage array.

59. An array structured universal LSI logic module capable of autonomous data storage and processing operation and having ability to successively interrupt a sequence of operations, perform another sequence of operations and resume the interrupted sequence at the point of interruption, comprising:

plural circuit elements integrally co-packaged on one substrate as an LSI unit; said elements including a multicoordinate read-only logic array for forming logical sums of logical products of binary input signals supplied in parallel combinations to said array, a multi-coordinate read/write storage array having plural addressible registers and circuits common to said registers for effecting address selection, read-out and write-in relative to said registers, and plural distinct groups of signal gating and conduction elements for interconnecting various coordinates of said logic array with various other coordinates of said logic array and with said storage array common circuits and with apparatus external to said module; said logic and storage array having respective standard coordinate dimensions common to corresponding array structures of a family or class of modules in which corresponding said logic arrays may be variously coupled at corresponding respective coordinate sites; said gating and conduction elements having construction and location corresponding identically to construction and location of corresponding gating and conduction elements in all other modules of said family; said groups of gating and conduction element including:

a first group of conditionally operable signal gating and conduction elements for conveying plural input signals in parallel relative to an associated first group of input coordinates of said logic array from apparatus external to said module;

a second group of conditionally operable gating and conduction elements for conveying plural output signals in parallel relative to an associated second group of output coordinates of said logic array to apparatus external to said module;

a third group of cyclically activated signal gating and conduction elements for cyclically conveying plural signals from an associated third group of output coordinates of said logic array to an associated third group of input coordinates of said logic array, thereby providing for cyclic recirculation of signal stimuli for iterative logical manipulation by said logic array;

a fourth group of cyclically activated signal gating and conduction elements for cyclically conveying plural signals in parallel from an associated fourth group of output coordinates of said logic array to an associated fourth group of write-in input coordinates of said storage array;

a fifth group of cyclically activated signal gating and conduction elements for conveying plural signals in parallel cyclically from an associated fifth group of readout output coordinates of said storage array to an associated fifth group of input coordinates of said logic array; and a sixth group of signal gating and conduction elements for conveying address selection signals in parallel from a sub-group of said third group of output coordinates of said logic array to said address selection circuits of said storage array for controlling selection of storage addresses relative to said write-in and read-out coordinates, said logic array being structured to be able to shift address selection signals at said output sub-group into storage write-in position relative to said storage array while concurrently shifting other address selection signals into address selection controlling position relative to said storage array for controlling selection of a storage register to hold said shifted signals, and to be able to reversely shift said address selection signals from a position of storage in said storage array into position for controlling address selection relative to said storage array.

60. An array structured logic module according to claim 59 including integral cycle clocking circuits co-packaged with said elements in one large scale integrated circuit unit, said clocking circuits being useful to supply cyclic clocking signals to said gating elements for conditioning said module for cyclic operation.

61. A module according to claim 59 including integrally co-packaged elements for storing internal conditions and logical gating and storing conduction connections between said conditioning elements and certain coordinates in said third groups of output and input coordinates of said logic array; said condition storing elements being useful to store respectively associated conditions variously occurring at random during cyclic operations of said logic array and to supply sequence conditioning stimuli to said logic array for initiating selection of associated sequences of operation of said module.

62. A module according to claim 61 wherein said logic array is structured to respond to conditioning stimuli supplied alternately by said first group of external gating and conduction elements and said condition storing elements; responses of said logic array to certain of said conditioning stimuli comprising initiation of associated autonomous interruption sequences of said module, each said interruption sequence comprising successive module operations of: (a) autonomous manipulation of control and data signal status stimuli relative to said certain coordinates in said second and third groups of output coordinates of said logic array, under control of said certain conditioning stimuli, causing said status stimuli to be served in predetermined spaces of said storage array; (b) autonomous manipulation of other data and control stimuli relative to said storage for accomplishing an interrupting operation or task; and (c) autonomous manipulation of said saved status stimuli to re-position parallel signal representations of said saved stimuli at respective coordinates in said second and third coordinate groups at which said stimuli originated prior to being saved, thereby causing an interrupted modular activity associated with said saved stimuli to be resumed at the point of interruption.

63. A module according to claim 62 wherein said other control stimuli associated with said interrupting operation include a nesting count control factor maintained in said module subject to being selectively incremented and decremented by operations of said logic array; said factor being incremented in value prior to effecting said saving manipulation, then maintained at said incremented value while said interrupting operation is performed and then decremented in value just prior to completion of said status repositioning manipulation; said incremented factor being used to determine the saving location in said storage array for retaining said status stimuli.

64. A module according to claim 63 wherein the said interrupting operation is subject to being interrupted by other higher priority interruption conditioning stimuli giving rise to associated other interrupting operations which include in sequence: further incrementating of said nesting count factor, saving of other interrupted status stimuli in storage array locations designated by said further incremented factor, performance of other interrupting operations, decrementing of said further incremented factor, and repositioning of parallel signal representations of said other saved status stimuli at respective logic array output coordinates to control resumption of said first mentioned interrupting operation at the point of interruption thereof.

65. A module according to claim 59 wherein said storage array includes decoding circuits in said common address selection circuits and said common circuits are all connected to respective coordinates of said logic array for cyclically: receiving and decoding coded address selection stimuli supplied from said sub-group of said third group of output coordinates of said logic array, storing output signal stimuli supplied from said fourth group of output coordinates of said logic array in storage spaces designated by said coded address stimuli, and supplying input signal stimuli to said fifth group of logic array input coordinates from storage spaces designated by said coded address stimuli.

66. A module according to claim 65 wherein in each cycle of operation of said gating and conduction elements the said supplying and storing operations of said storage array are performed in succession, the supplying operation first.

67. A module according to claim 59 wherein the numbers of bits represented by the totality of read-only couplings in said logic array is much greater than the total bit storage capacity of said storage array.

68. In a universal logic module:
   a multi-coordinate programmable logic matrix and a plural coordinate random access storage matrix having fewer coordinate positions than said logic matrix; said matrices interconnected in an INNER LOOP circuit and subject to cyclic operation as an autonomous unit; said logic matrix having OUTER LOOP feedback connections separate from said INNER LOOP for directly circulating outputs of said logic matrix and EXTERNAL IN and EXTERNAL OUT connections for external access; certain of said OUTER LOOP connections being coupled to said storage matrix for addressing control.

\* \* \* \* \*